US012796664B2

(12) United States Patent
Good

(10) Patent No.: US 12,796,664 B2
(45) Date of Patent: Nov. 17, 2026

(54) DIVE SPEAR

(71) Applicant: Daniel Good, Tequesta, FL (US)

(72) Inventor: Daniel Good, Tequesta, FL (US)

( * ) Notice: Subject to any disclaimer, the term of this patent is extended or adjusted under 35 U.S.C. 154(b) by 0 days.

(21) Appl. No.: 19/221,001

(22) Filed: May 28, 2025

(65) Prior Publication Data

US 2025/0374899 A1 Dec. 11, 2025

Related U.S. Application Data

(60) Provisional application No. 63/657,330, filed on Jun. 7, 2024.

(51) Int. Cl.
*A01K 81/04* (2006.01)
*F41B 7/00* (2006.01)
*F41B 7/04* (2006.01)

(52) U.S. Cl.
CPC ................ *A01K 81/04* (2013.01); *F41B 7/00* (2013.01); *F41B 7/04* (2013.01)

(58) Field of Classification Search
CPC ........ A01K 81/00; A01K 81/04; A01K 81/06; F41B 7/04; F41B 7/00; F41B 3/02
USPC .......... 43/6; 124/17, 20.1, 20.3, 22, 23, 41.1
See application file for complete search history.

(56) References Cited

U.S. PATENT DOCUMENTS 2,522,060 A * 9/1950 Ridland ................. A01K 81/00 124/80
2,760,480 A * 8/1956 Carroll ................... A01K 81/00 124/31
3,006,330 A * 10/1961 De Bach ................... F41B 7/04 124/25
3,016,891 A * 1/1962 Ebeling .................. A01K 81/00 43/6
3,262,441 A * 7/1966 Senne ....................... F41B 7/04 124/22
3,265,054 A * 8/1966 Gruenenfelder ....... A01K 81/00 124/40
3,340,642 A * 9/1967 Vasiljevic ............. A01K 81/00 102/512
3,455,288 A * 7/1969 Knerr ........................ F41B 3/02 124/44.5
3,509,863 A * 5/1970 Barker .................... F41B 7/003 124/31
3,585,979 A * 6/1971 Hendricks ................ F41B 7/04 124/35.1
3,614,947 A * 10/1971 Feldman ................... F41B 3/02 473/585

(Continued)

FOREIGN PATENT DOCUMENTS

CN 107494475 A * 12/2017 ............. A01K 81/00
CN 213369479 U * 6/2021

(Continued)

*Primary Examiner* — Darren W Ark
(74) *Attorney, Agent, or Firm* — McHale & Slavin, P.A.

(57) ABSTRACT

A handheld spearfishing device designed with a pulley system configured to reduce the effective length of the device without compromising the arming distance needed to expel a spear. The housing, comprising front and rear surfaces, lateral side walls, a top wall, and a bottom wall, defines a firing chamber axis and a barrel alongside two band conduits n a parallel direction. This configuration allows for streamlined functionality and efficient deployment of a spear underwater.

18 Claims, 6 Drawing Sheets

(56) References Cited

U.S. PATENT DOCUMENTS

| | | | | | |
|---|---|---|---|---|---|
| 4,014,125 | A * | 3/1977 | Baldi | A01K 81/00 | 43/6 |
| 4,027,418 | A * | 6/1977 | Baldi | A01K 81/00 | 43/6 |
| 4,193,386 | A * | 3/1980 | Rossi | F41B 7/04 | 124/22 |
| 4,458,658 | A * | 7/1984 | Blair | F41B 3/02 | 124/20.3 |
| 4,573,445 | A * | 3/1986 | Webb | F41B 3/02 | 403/375 |
| 4,703,744 | A * | 11/1987 | Taylor | F41B 3/02 | 124/20.3 |
| 4,894,940 | A * | 1/1990 | Frain | F41G 1/35 | 362/110 |
| 4,895,128 | A * | 1/1990 | Okada | A01K 81/00 | 124/31 |
| 5,243,955 | A * | 9/1993 | Farless | F41B 7/04 | 124/20.3 |
| 5,524,603 | A * | 6/1996 | Menzer | F41B 7/04 | 124/20.3 |
| 7,926,474 | B2 * | 4/2011 | Berry | A01K 81/06 | 124/20.3 |
| 9,414,578 | B2 * | 8/2016 | Thombrough | F41B 7/04 | |
| 11,519,688 | B2 * | 12/2022 | Camarena-Vazquez | F41B 7/003 | |
| 12,207,631 | B2 * | 1/2025 | Pedemonte | F41B 7/04 | |
| 12,372,324 | B2 * | 7/2025 | Laboccetta | F41B 11/83 | |
| 12,465,030 | B2 * | 11/2025 | Pedemonte | F41B 7/04 | |
| 2006/0243262 | A1 * | 11/2006 | Berry | A01K 81/06 | 124/17 |
| 2012/0085330 | A1 * | 4/2012 | Hickerson | A01K 81/04 | 124/22 |
| 2014/0165981 | A1 * | 6/2014 | Lien | F41B 5/0094 | 124/20.3 |
| 2014/0318521 | A1 * | 10/2014 | Garofalo | F41B 11/83 | 124/61 |
| 2015/0204633 | A1 * | 7/2015 | Nelson | F41B 11/83 | 124/83 |
| 2016/0061552 | A1 * | 3/2016 | Nicely | F41B 7/04 | 124/80 |
| 2016/0069634 | A1 * | 3/2016 | Zournatzis | F41B 7/04 | 124/56 |
| 2019/0323793 | A1 * | 10/2019 | Shaulov | F42B 6/02 | |
| 2022/0065581 | A1 * | 3/2022 | Zournatzis | F41B 7/04 | |
| 2022/0299290 | A1 * | 9/2022 | Camarena-Vazquez | A01K 81/04 | |
| 2023/0247974 | A1 * | 8/2023 | Pedemonte | F41B 7/04 | 124/22 |
| 2025/0085078 | A1 * | 3/2025 | Kim | A01K 81/00 | |
| 2026/0076349 | A1 * | 3/2026 | Alvarez | A01K 81/04 | |

FOREIGN PATENT DOCUMENTS

| | | | | |
|---|---|---|---|---|
| CN | 214962087 | U * | 12/2021 | A01K 81/00 |
| CN | 114451368 | A * | 5/2022 | A01K 81/06 |
| EP | 1715284 | A1 * | 10/2006 | F41B 3/005 |
| EP | 2136176 | A2 * | 12/2009 | F41B 7/04 |
| EP | 3081890 | A1 * | 10/2016 | F41B 7/04 |
| ES | 2166645 | A1 * | 4/2002 | |
| FR | 3021399 | A1 * | 11/2015 | F41B 7/04 |
| FR | 3028146 | A3 * | 5/2016 | A01K 89/016 |
| KR | 101615815 | B1 * | 4/2016 | |
| KR | 102220732 | B1 * | 2/2021 | A01K 85/01 |
| WO | WO-2012150387 | A1 * | 11/2012 | F41B 7/04 |
| WO | WO-2025188252 | A1 * | 9/2025 | F41B 7/04 |

* cited by examiner

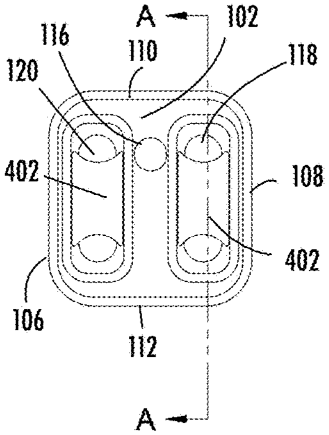
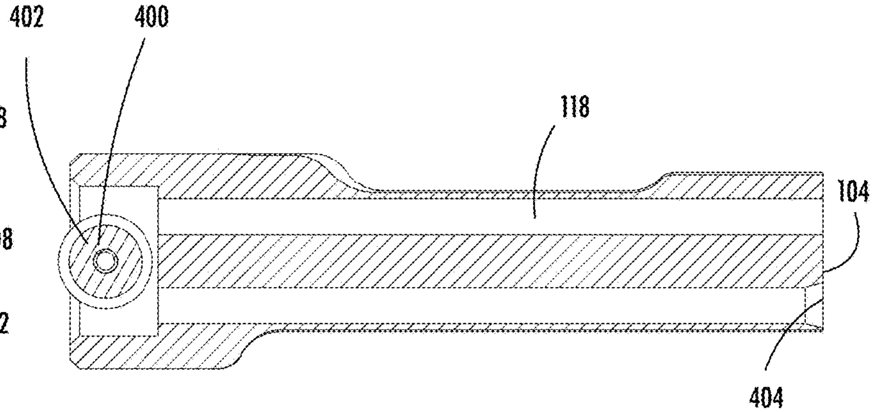
SECTION A-A
SCALE 1:1
FIG. 6A
FIG. 6B

DIVE SPEAR

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63, 657, 330 entitled "DIVE SPEAR", filed Jun. 7, 2024, the contents of which is incorporated herein by reference in its entirety.

FIELD OF THE INVENTION

This invention generally to present relates to a spearfishing mechanism. More specifically, the present invention relates to a handheld speargun device configured to propel a spear at a target.

BACKGROUND OF THE INVENTION

Spearfishing, an ancient method of catching fish, has been practiced for thousands of years across various cultures worldwide. Historically, it served as a primary means of sustenance for coastal communities. The technique involves using a spear-like instrument to impale fish underwater. Over time, different tools and techniques have emerged to aid in spearfishing, ranging from rudimentary sharpened sticks to more sophisticated devices. Today, spearfishing enthusiasts utilize specialized equipment such as spearguns and pole spears, enabling them to target fish with precision while submerged.

Spearfishing devices typically consist of a stock or barrel, a spear, and an elastic band used for propulsion of the spear. The mechanism operates by stretching the elastic band and releasing it, propelling the spear forward towards the target. Spears vary in size and design, with some featuring barbed tips to secure the catch upon impact. These devices require skill and precision to aim accurately, making them popular among skilled underwater hunters.

Operating spearfishing devices underwater presents unique challenges, including maneuverability and size constraints. A typical spearfishing device with an attached spear can be cumbersome, limiting the diver's agility and range of motion. Additionally, underwater currents and visibility issues further complicate the task of targeting fish. Despite these difficulties, advancements in design and technology continue to improve the efficiency and usability of spearfishing equipment.

Modern spearfishing devices face challenges such as elongated barrels, which can affect spear trajectory and accuracy. In some cases, the barrel of a spearfishing device may deform after prolonged use. Additionally, some devices require considerable force to stretch the elastic band, making them cumbersome and tiring to use over extended periods. Achieving optimal balance and maneuverability while ensuring effective propulsion remains a primary focus for manufacturers seeking to enhance the performance of spearfishing devices.

Contemporary spears often feature attachments such as cord reels or triggers for convenience and versatility. For example, U.S. Pat. No. 9,414,578 discloses a device for spearfishing having a barrel parallel to a spear conduit and also may include many accessories, such as a handle or reel. However, incorporating multiple attachments onto a single spearfishing device can increase complexity and compromise usability. In some cases, these types of spearfishing devices have an increased weight and are not able to be retrieved if the device sinks. Maintaining a streamlined design with ergonomic features is essential for ensuring ease of use and efficient operation underwater. Simplifying the device's structure while maximizing functionality remains a key objective in the field of spearfishing equipment.

There is a growing interest in integrating a pulley system within the barrel to solve the challenges of lengthy and cumbersome handheld spearfishing devices. This approach may reduce the effective length of the device when the elastic band is stretched for propulsion. By incorporating this type of pulley system, the aim is to enhance maneuverability and ease of use while maintaining optimal performance in underwater environments. This inventive solution holds promise for revolutionizing the design of handheld spearfishing devices, offering enthusiasts a more efficient and convenient fishing experience.

SUMMARY OF THE INVENTION

The present invention discloses a handheld spearfishing device designed with a pulley system configured to reduce the effective length of the device without compromising the arming distance needed to expel a spear. The housing, comprising front and rear surfaces, lateral side walls, a top wall, and a bottom wall, defines a firing chamber axis and a barrel alongside two band conduits in a parallel direction. This configuration allows for streamlined functionality and efficient deployment of a spear underwater.

Central to the device's functionality is an elastic band positioned within the housing, intended to propel the spear at a target. The elastic band is integrated with a pulley system housed within the barrel assembly. This pulley, mounted within the housing, serves as a pivotal component in reducing the effective length of the device during propulsion. As the elastic band is stretched for firing, tension is exerted and distributed through the band, thereby halving the effective length of the housing. This design makes the device's overall size smaller, more maneuverable underwater, and cuts the cost of production.

In one exemplary embodiment, the present invention provides a handheld spearfishing device comprising a barrel assembly elongated housing including a front housing surface, a rear housing surface, opposing lateral side walls, a top wall, a bottom wall, the housing including a length along a firing chamber axis and a width across the firing chamber axis, the length being greater than the width, the housing defining a barrel along the firing chamber and two band conduits parallel to the barrel, each of the barrel and the two band conduits extending within the housing from the front housing surface to the rear housing surface and each of the opposing lateral side walls, the top wall, and the bottom wall extending from the front housing surface to the rear housing surface; an elastic band configured to propel a spear, the elastic band having a first end attached to the housing and a second end arming mechanism; and a pulley mounted within the housing; wherein the elastic band is wrapped around the pulley and configured to rotate about an axis perpendicular to the firing chamber axis of the housing wherein tension is exerted on the elastic band is configured to reduce the effective length of the housing by half when the elastic band is stretched for propulsion.

An objective of the invention is to provide a spearfishing device having rollers that add an additional length of the housing to the band thereby increasing the elastic potential energy in the band.

Still another objective of the invention is to provide a spearfishing device with half the effective length of the housing that maintains mechanical advantage when the elastic band is stretched for propulsion.

Yet still another objective of the invention is to provide a spearfishing device that is ergonomic and conforms to the user's hand in order to maintain grip and control of the device.

Yet another objective of the invention is to provide a spearfishing device that is lightweight in construction whereby it is able to float to the surface of water if dropped by a user.

It will also be appreciated that various combinations of the features disclosed hereafter for a handheld spearfishing device are also possible as desired.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

The present invention is illustrated and described herein with reference to the various drawings, in which like reference numbers are used to denote like system components/method steps, as appropriate, and in which:

FIG. 6A is a back view thereof; and

FIG. 6B is a cross-sectional view of FIG. 6A taken along the line A-A.

DETAILED DESCRIPTION OF THE INVENTION

Figure 1:
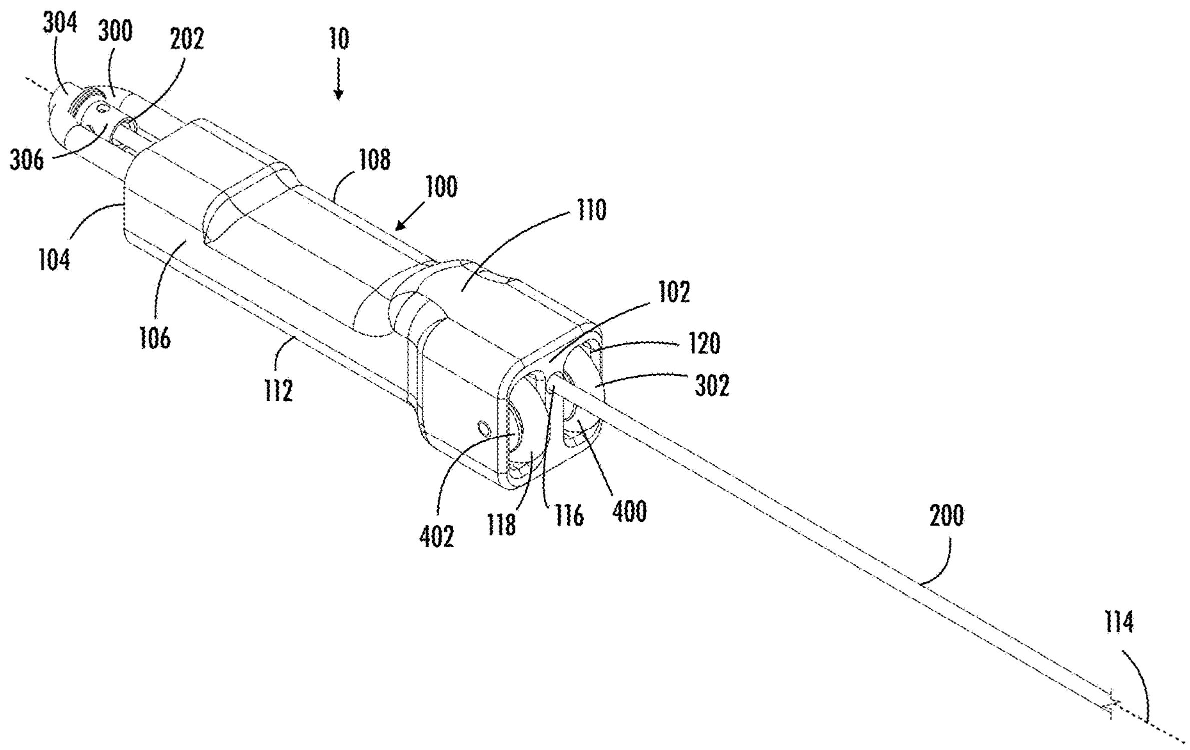
FIG. 1 is an upper left perspective view of a handheld spearfishing device.
Figure 2:
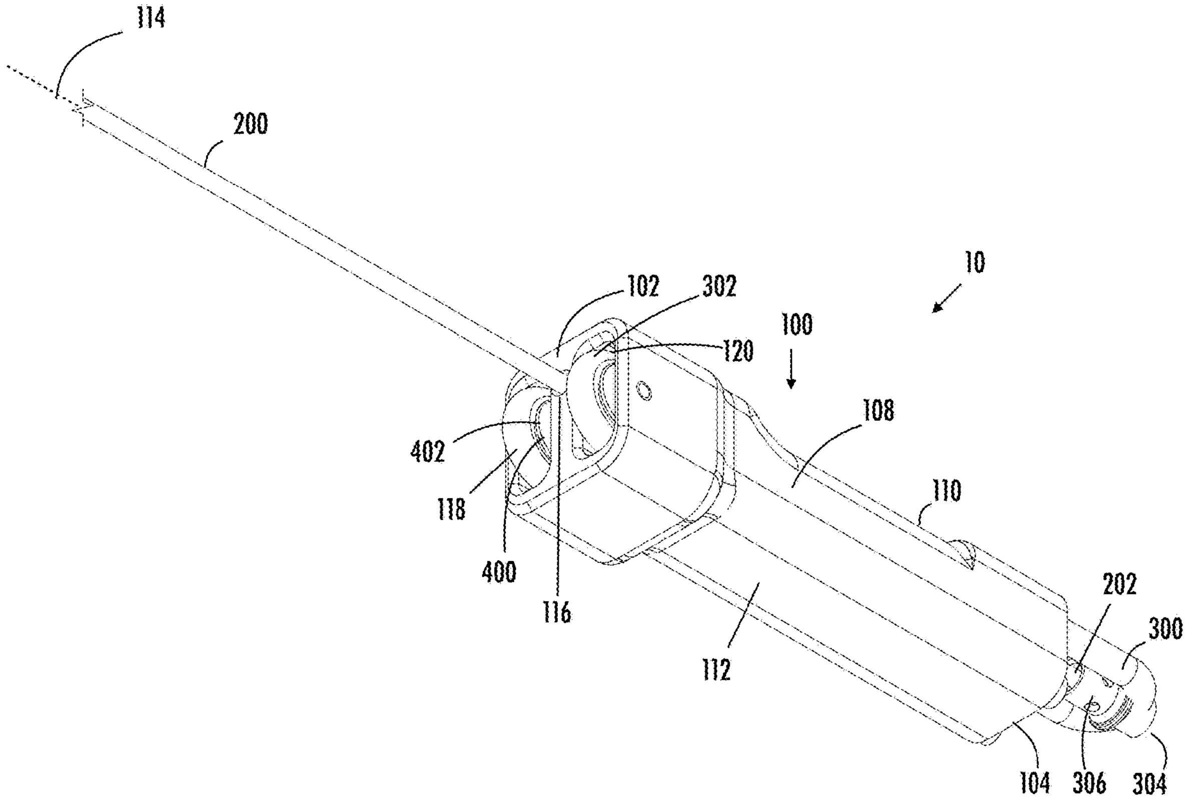
FIG. 2 is a bottom right perspective view thereof.
Figure 3:
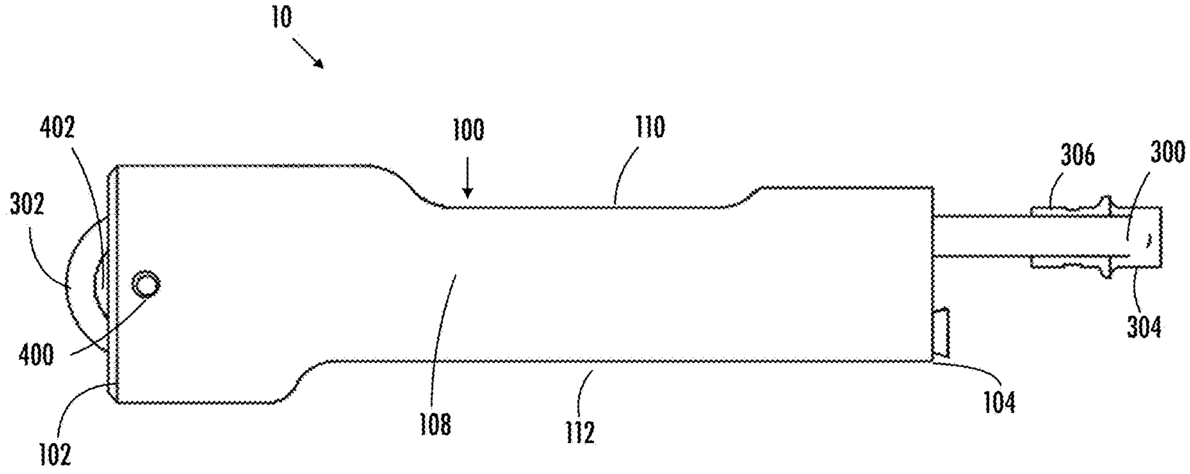
FIG. 3 is a left-side view thereof.
Figure 4:
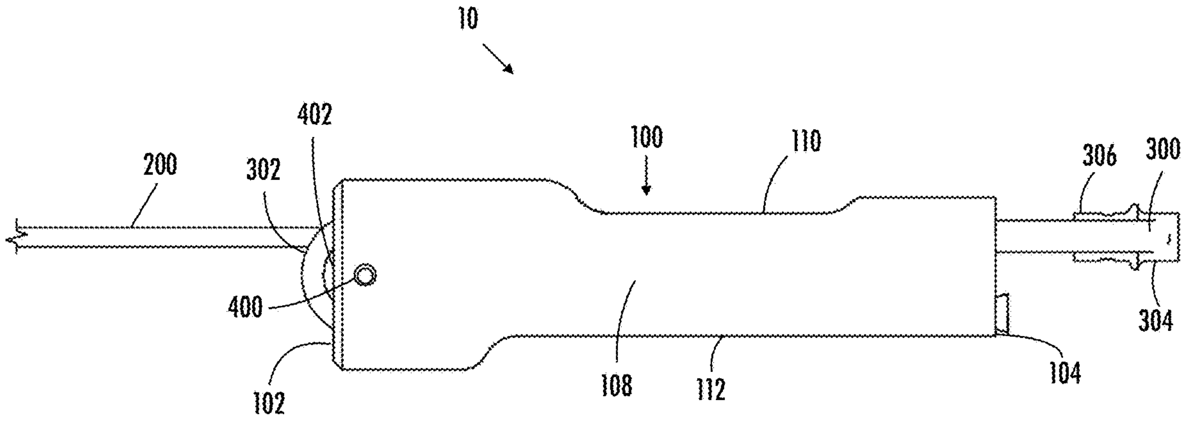
FIG. 4 is a left-side view of the handheld spearfishing device with a spear therewithin.
Figure 5:
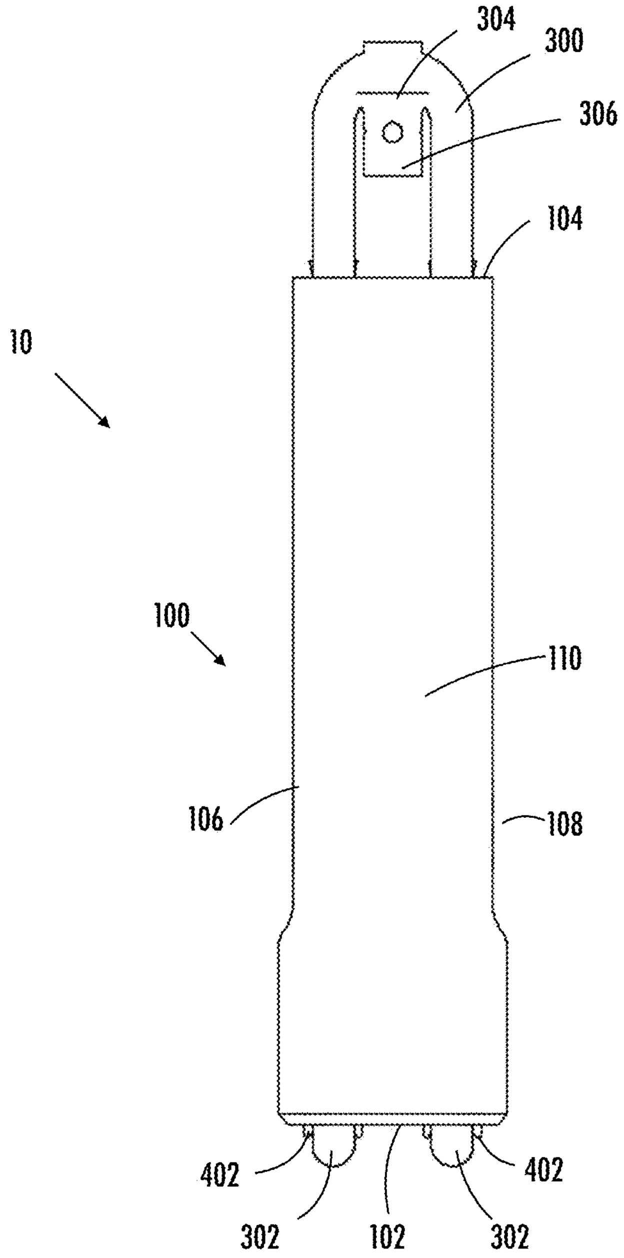
FIG. 5 is a top view of the handheld spearfishing device.

While the present invention is susceptible of embodiment in various forms, there is shown in the drawings and will hereafter be described a presently preferred, albeit not limiting, embodiment with the understanding that the present disclosure is to be considered an exemplification of the present invention and is not intended to limit the invention to the specific embodiments illustrated.

Now referring to the figures, in one exemplary embodiment, a handheld spearfishing device 10 includes a barrel assembly elongated housing 100 including a front housing surface 102, a rear housing surface 104, opposing lateral side walls 106, 108, a top wall 110, and a bottom wall 112. In a preferred embodiment, the top wall 110 and the bottom wall 112 are rounded to provide an ergonomic design to adequately conform to the curvature of a user's hand, allowing the user to grip and control the handheld spearfishing device 10. The housing 100 includes a length along a firing chamber axis 114 and a width across the firing chamber axis 114. In a preferred embodiment, the length of the handheld spearfishing device 100 is greater than the width.

The firing chamber axis 114 is disposed along a barrel 116. The barrel 116 extends from the front housing surface 102 to the rear housing surface 104 of the handheld spearfishing device 100 and is designed for receipt of a spear 200. The barrel 116 is sized and shaped to accommodate the diameter of a traditional spear 200. In a preferred embodiment, the barrel 116 may have a diameter of between approximately 0.375 inches (about 9.525 mm) and approximately 0.50 inches (about 12.70 mm) to accommodate the outer diameter of a traditional spear 200. The size and shape of the barrel 116 is not limiting. The housing 100 also includes two band conduits 118, 120 disposed along the firing chamber axis 114 and parallel to the barrel 116. Both the barrel 116 and the two band conduits 118, 120 extend within the housing 100 from the front housing surface 102 to the rear housing surface 104. Accordingly, the opposing lateral side walls 106, 108, the top wall 110, and the bottom wall 112 extend from the front housing surface 102 to the rear housing surface 104.

Additionally, the housing 100 may have a solid construction or a hollow construction. Depending on the material selection of the housing 100, either construction may be suitable. In a preferred embodiment, the handheld spearfishing device 10 may be lightweight enough to float to the surface of water in the case of the user losing grip of the device 10. In one embodiment, the housing 100 is manufactured using 3D printed PLA plastic. In an alternative embodiment, the housing 100 is manufactured using a hard plastic such as polyethylene, polypropylene, or polycarbonate to withstand the firing of the spear 200. The housing 100 may also be constructed of lightweight metal, such as aluminum, or may be constructed of wood, or a combination thereof. The material in which the housing 100 is constructed is not limiting. Further, the housing 100 may have a length of between approximately 7.50 inches (about 190.50 mm) and approximately 9.5 inches (about 241.30 mm).

The handheld spearfishing device 10 includes an elastic band 300 configured to propel a spear 200. The elastic band 300 has a first end 302 attached to the housing 100 and a second end arming mechanism 304. The arming mechanism 304 is a means for engaging the elastic band 300 with the proximal end 202 of the spear 200. By way of example, the elastic band 300 may be threaded through a hole in a spear retainer 306 wherein the spear retainer 306 lies within the bend of the elastic band 300. In a preferred embodiment, the spear retainer 306 has a recess that is constructed and arranged to engage with the proximal end 202 of the spear 200. The spear 200 itself may not be permanently affixed to the spear retainer 306, however, the spear 200 may be secured by the pressure exerted onto the spear retainer 306 from the spear 200 when the user retracts the spear 200 and creates a pull force on the elastic band 300. In an alternative embodiment, the handheld spearfishing device 10 does not include a spear retainer 306, and the proximal end 202 of the spear 200 may seated directly onto the elastic band 300, which may include a recess or notch in which the proximal end 202 may fit, not shown.

Mechanical advantage of the spearfishing device 10 is created via a pulley system 400 mounted within the housing 100. The pulley system 400 includes at least one roller 402. The elastic band 300 is wrapped around at least one roller 402 of the pulley system 400 and configured to rotate about an axis perpendicular to the firing chamber axis 114 of the housing 100 wherein tension exerted on the elastic band 300 is configured to reduce the effective length of the housing 100 by half when the elastic band 300 is stretched for propulsion. The rollers 402 essentially add an additional length of the housing 100 to the elastic band 300 thereby increasing the elastic potential energy in the elastic band 300, as shown in FIG. 6B. The elastic band 300 is secured to a band conduit end 404, wraps around the roller 402, and exits the band conduit 118 from the rear housing surface 104. Additionally, the rollers 402 provide an increase in forward acceleration by effectively pulling the elastic band 300 forward due to the rotation of the roller 402 itself. In a preferred embodiment, the pulley system 400 includes two rollers 402. The size, shape, and construction of the rollers 402 are not limiting.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements, possesses those one or more steps or elements, but is not limited to possessing only those one or more elements. Likewise, a step of a method or an element of a device that "comprises," "has," "includes," or "contains" one or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A handheld spearfishing device comprising:

a barrel assembly formed from an elongated housing having a front housing surface, a rear housing surface, opposing lateral side walls, a top wall, and a bottom wall;

a firing chamber defining a barrel formed within said housing having a length along a firing chamber axis and a width across said firing chamber axis, said length being greater than said width;

a first band conduit and a second band conduit positioned parallel to said barrel;

a pulley system having at least one roller mounted within said housing;

an elastic band extending through said first and second band conduits and configured to propel a spear, said elastic band having a first end attached to said housing and a second end arming mechanism;

wherein said elastic band is wrapped around said at least one roller, and said at least one roller is configured to rotate about an axis perpendicular to said firing chamber axis of said housing, wherein tension exerted on said elastic band is configured to reduce the effective length of said housing by half when said elastic band is stretched for propulsion of the spear.

2. The handheld spearfishing device of claim 1, wherein said top wall and said bottom wall are rounded to provide an ergonomic design conforming to the curvature of a user's hand.

3. The handheld spearfishing device of claim 1, wherein said barrel has an inner diameter between 0.375 inches and 0.50 inches.

4. The handheld spearfishing device of claim 1, wherein said handheld spearfishing device has a hollow construction.

5. The handheld spearfishing device of claim 1, wherein said handheld spearfishing device has a solid construction.

6. The handheld spearfishing device of claim 1, wherein said housing is manufactured using 3D printed PLA plastic.

7. The handheld spearfishing device of claim 1, wherein said housing is constructed from polyethylene, polypropylene, or polycarbonate.

8. The handheld spearfishing device of claim 1, wherein the length of said housing is between 7.50 inches and 9.5 inches.

9. The handheld spearfishing device of claim 1, wherein said second end arming mechanism of said elastic band includes a spear retainer having a recess that is constructed and arranged to engage with a proximal end of said spear.

10. The handheld spearfishing device of claim 1, wherein said at least one roller further includes two rollers, each roller disposed within a respective band conduit of said first and second band conduits, and each roller being rotatable about said axis perpendicular to said firing chamber axis.

11. The handheld spearfishing device of claim 1, wherein said first end of said elastic band is secured to an end of said first band conduit.

12. A handheld spearfishing device comprising:

a barrel assembly comprising an elongated housing having a front housing surface, a rear housing surface, opposing lateral side walls, a top wall, and a bottom wall, the housing defining a length along a firing chamber axis and a width perpendicular to the firing chamber axis, wherein the length is greater than the width, and the top wall and bottom wall are contoured to ergonomically conform to a user's hand;

a barrel disposed within the housing and extending from the front housing surface to the rear housing surface along the firing chamber axis, the barrel being configured to receive a spear;

at least two band conduits disposed within the housing and extending parallel to the barrel from the front housing surface to the rear housing surface;

an elastic band configured to generate a propulsion force for the spear, the elastic band having a first end secured within one of the band conduits and a second end configured to engage a proximal end of the spear via an arming mechanism;

a pulley system disposed within the housing, the pulley system comprising at least one roller configured to rotate about an axis perpendicular to the firing chamber axis, wherein the elastic band is routed around the at least one roller such that stretching the elastic band reduces the effective housing length required to generate the propulsion force, and the rotation of the at least one roller increases forward acceleration of the spear.

13. The handheld spearfishing device of claim 12, wherein the barrel has an inner diameter between 0.375 inches and 0.50 inches.

14. The handheld spearfishing device of claim 12, wherein the housing is constructed of a lightweight material selected from the group consisting of PLA plastic, polyethylene, polypropylene, polycarbonate, aluminum, and wood.

15. The handheld spearfishing device of claim 12, wherein the housing is sufficiently buoyant to float on the surface of water when released by a user.

16. The handheld spearfishing device of claim 12, wherein the arming mechanism includes a spear retainer having a recess for receiving the proximal end of the spear.

17. The handheld spearfishing device of claim 12, wherein the at least one roller further comprises two rollers, each roller disposed within a respective band conduit of said at least two band conduits, and each roller being rotatable about the axis perpendicular to the firing chamber axis.

18. The handheld spearfishing device of claim 17, wherein the rollers are configured to increase the effective length of the elastic band within the housing by redirecting the elastic band along the firing chamber axis.

* * * * *